Figure 1:
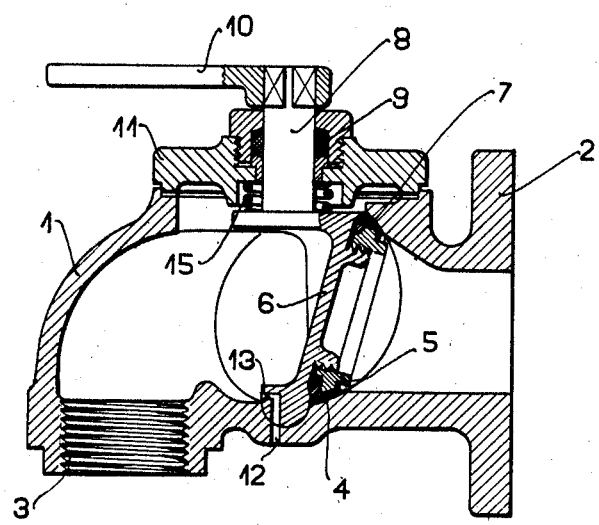

July 24, 1928.  1,678,204

H. SRULOWITZ

SHUTTING OFF DEVICE FOR STEAM PIPES AND THE LIKE

Filed Jan. 6, 1926

H. Srulowitz
INVENTOR

By: Marks & Clerk
ATTYS

Patented July 24, 1928.

1,678,204

UNITED STATES PATENT OFFICE.

HERMANN SRULOWITZ, OF VIENNA, AUSTRIA.

SHUTTING-OFF DEVICE FOR STEAM PIPES AND THE LIKE.

Application filed January 6, 1926, Serial No. 79,625, and in Austria, January 19, 1925.

This invention relates to stop valves or slides for steam pipe or similar connections and especially to devices of the general type of a gate valve or a stop cock.

The invention comprises a shutting off device similar to the general type of devices above referred to in which for shutting off the cross section of the pipe or other connection a packing ring is used, which makes a tight connection as well against its carrier as against the sealing surface upon which it slides. The packing ring thus forms a sealing bridge member between the sealing surface and the valve body or disk. If the packing ring is of the resilient or expansible kind it may be fixedly connected with the valve body or disk.

The great advantage of a stop valve provided with the above described sealing means is the very easy way in which it can be moved. The packing ring is pressed on to the sealing surface with a pressure which is not larger than the pressure exerted by the fluid in the pipe on the very small sealing ledge while in the usual stop valves or gate slide valves the pressure corresponds to the amount of pressure upon the whole cross section including the sealing ledge. With the arrangement according to this invention this large pressure is taken up by the valve body and transmitted to the bearing or holding means of the same. The friction thus caused may be reduced by suitable means f. i. by providing bearings having a smaller diameter than the sealing surface. The stop valve is thereby entirely relieved from pressure. In all cases in which the packing ring should be treated with care so as to reduce wear the packing ring may be arranged to bear upon the sealing surface only in the shutting off position, while in the other position where the fluid passage is free the packing ring should not touch the sealing surface, but is kept at a certain—very small—distance therefrom. To ensure this the packing ring must either under external elastic pressure or by its own resiliency be drawn back from the sealing surface so that only the pressure of the fluid when acting upon the ring overcomes this force and presses the ring down upon the sealing face. The packing ring is thus enabled to move along the sealing surface without friction and only in the shutting off position is firmly pressed against this surface. When the shut off device is opened the packing ring again frees itself from the surface as soon as the pressureless space of the shutting off device is under pressure. By these means the resistance against movement of the shutting off device is further decreased and the wearing of the packing ring is reduced to a very material extent. To ensure that the ring is firmly pressed against the sealing surface in shutting off position of the valve the space which is relieved from pressure may have an exit to the open air controlled by suitable means, in such a manner that the exit is open in the shut off position and the fluid therein may escape while on the other hand the excess pressure necessary to press the packing ring upon the sealing surface is established at the time at which such escape occurs.

If the stop valve provided with these means is used at the end of the main steam pipe of a heating installation in a railway car it is preferable to arrange the exit opening in such a way that it may be used simultaneously for draining the pressure-less space. The drops of water due to leakage through the packing ring can then escape freely into the open through said opening, while in other arrangements they would penetrate into the hose coupling behind the shutting off device and thus lead to a freezing of the installation.

The accompanying drawings shows one modification of the device according to the invention.

Figure 2:
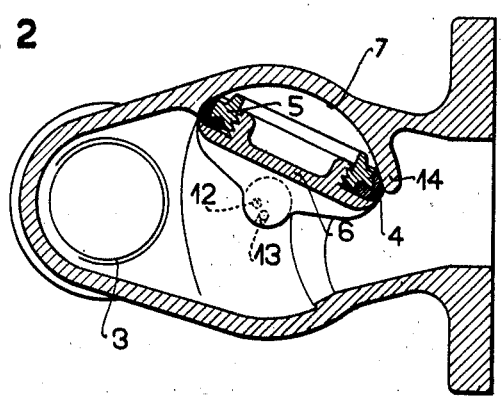

Fig. 1 shows a vertical longitudinal section through the shutting off valve, the valve being shown in the shutting off position. Fig. 2 is a horizontal section through the device, represented however in this case in the open position, where the entire cross section is freed. The modification shown is relative to a shutting off device as used in the main steam pipe of heating installations for railway cars and the like. In the drawings, 1 designates the casing, 2 the flange for securing the device on one side, 3 a screw threaded portion by means of which connection can be made on the other side with the hose or pipe coupling attached to the railway car, 4 is the resilient packing ring made generally of india rubber. This ring is fixed by means of a screw threaded holding piece 5 to the valve disc or plug.

The packing ring has a V- or L-shaped cross section. One leg of the angle serves for fixing the packing ring in the usual manner. The other leg is free and moves along the metallic sealing surface 7, when the stop valve is operated. The spindle 8 of the plug is kept tight by means of a stuffing box 9 and is provided with a handle. The casing is closed by means of a cover 11. When the cover is removed the whole shutting off member may be lifted bodily out of the casing and thereby the packing ring may be easily removed and replaced by another whenever this appears to be necessary. In the lower part of the casing a small opening 12 is provided, which is controlled by a corresponding opening 13 in the lower part of the plug in such a manner that in the closed position of the shutting off member the space communicating with the hose or pipe coupling is connected with the open air. In the open position of the shutting off member the opening 12 is covered. A spring 15 is provided to ensure a correct position of the plug. The casing is provided with a projection 14 acting as a screen and protecting that side of the packing which is most exposed in the open position against any action of the passing fluid.

The bottom of the casing is shaped as a trough or mould, so that drops of water which may leak through the packing ring when the pipe is closed cannot penetrate into the coupling proper, but are discharged from the lower part of the trough into the open air through the openings 13 and 12.

The operation of the device is the following. Assuming the shutting off device to be in its open position (Fig. 2) the steam will flow from the pipe connected at the flange 2 into the coupling connected with the part 3 or in the inverse direction. The packing ring in this position is completely covered by the metallic sealing surface 7 or by the projection 14 respectively. Injuring or damaging of the packing ring by bodies carried with the steam or by the frictional action of the steam or water are thereby entirely prevented. As the packing ring in this position is moreover subjected to the same pressure on all sides, it is in the normal relieved state in which it is positioned at a certain distance from the sealing surface. If the handle 10 is turned from the open to the closed position, the packing ring is moved so as to pass over the metallic sealing surface without contact with the same.

When the packing ring has been moved into the closing position the opening 12 in the bottom of the casing is freed simultaneously and the steam or vapours contained in the room connected with the coupling are escaping into the open air. A pressure difference now exists between the space communicating with the pipes and the space communicating with the coupling. The packing ring is inflated and yieldingly bears against the metallic surface thus effecting tight sealing between the rooms. The pressure now acting upon the sealing surface is however only corresponding to the pressure acting upon the annular contact face between the packing ring and the casing as the steam pressure acting upon the plug 6 tends to withdraw the packing ring from the sealing surface and is taken up by the upper and lower bearing of the plug.

The shutting off mechanism is therefore pressure relieved as regards the resistance against moving as in contradistinction to the usual gate valve the frictional resistance of the valve is not dependent of the area of the gate valve contained within the sealing ledge.

The trough like shape of the casing has for its object to prevent drops of water escaping by virtue of a leakage to penetrate into the coupling to prevent freezing of the drops one after the other as they penetrate into the coupling when not in use and therefore shut off, whenever the sealing by shutting off member is not entirely perfect and leakage occurs.

The packing ring and in connection therewith the sealing surface may be of any suitable shape. If the packing ring is circular as shown, the metallic sealing surface must be spherical. If however it is desired to have a cylindrical surface, then the packing ring is rectangular in its general form, but the sides of the rectangle must be curved to conform to the cylindrical shape of the sealing surface. Also any other form may be adopted provided that the sealing surface is a surface of rotation with the axis of the spindle of the plug as an axis of rotation.

The construction as described has many specific advantages over the usual constructions with metallic surfaces. The tightness of the sealing is very much improved as the construction is leakage-proof also with very great pressures. Moreover the valve is very easy to move and every regrinding or reworking of the sealing surfaces to restore perfect sealing can be dispensed with. The packing ring is easily interchangeable even by unskilled workmen and freezing of the coupling when not in use is prevented. Moreover the construction of the coupling may be much simplified.

What I claim is:

1. A stop valve of the rotary type comprising a valve casing with a passageway for a fluid, provided with a metallic rubbing surface, a metallic valve body capable of angular movement around an axis and comprising an operative part adapted to cover said passageway and capable of being rotated around an angle so as to be withdrawn into an inoperative operation, said operative part being at a certain distance from the metallic rubbing surface, both surfaces being arranged so as to leave a constant free gap between them during the rotary movement of the valve, an inflatable packing ring seated in the operative part of said valve body and capable of being inflated by the pressure of the fluid, said packing ring when inflated bridging the gap between the metallic valve body and the metallic rubbing surface.

2. A stop valve of the rotary type comprising a valve capable of angular movement around an axis, a casing with a passageway for a fluid, a metallic surface in said casing being part of a surface of revolution around the axis of rotation of the valve, said valve having a metallic valve body of a size sufficient to cover said passageway with its operative surface and capable of being withdrawn from said opening by angular movement along the metallic surface of revolution of the casing, the operative surface of said body being arranged at a distance from the metallic sealing surface and parallel thereto, both surfaces being arranged so as to leave a constant free gap between each other, during the rotary movement of said valve, an inflatable packing ring seated in the operative face of said valve body and capable of being inflated by the pressure of the fluid, the packing ring when inflated bridging the constant gap between said valve body and said metallic sealing surface and when not inflated seated at a distance therefrom, the rotational opening and closing movement of said valve body and packing ring around its axis being effected in a direction transverse to the passageway.

3. A stop valve of the rotary type comprising a valve casing provided with a passageway for a fluid, a metallic valve body adapted to close said passageway, means for rotating said valve body around an axis substantially transverse to said passageway, an operative surface on said metallic valve body adapted to hold the means for sealing the passage, a metallic sealing surface in said casing surrounding said passageway, said surface being a surface of revolution around the axis of rotation of the valve body, the operative surface of the valve body and the sealing metallic surface being arranged at a distance from each other leaving a gap between them, which remains unaltered during rotation, a pocket within said casing adapted to accommodate the valve body with its sealing means, the surface of the pocket being a continuation of the metallic sealing surface, an inflatable packing ring arranged in the operative surface of the valve body adapted to be inflated by the pressure of the fluid and when inflated bridging the gap between the operative valve body surface and the metallic sealing surface and when not inflated seated at a certain distance therefrom and from the surface of the pocket.

4. A stop valve of the rotary type comprising a rotatable valve member, adapted to shut a passageway for fluid under pressure, a metallic sealing surface being a surface of revolution around the axis of rotation of said valve, an inflatable packing ring seated upon said valve member, all its points being equi-distant from said metallic sealing surface during rotation when not inflated, said packing ring being capable of being inflated by the pressure of the fluid, to bridge the distance between the sealing surface and the valve member and to effect tight sealing between said parts when the valve body is closing the passageway.

5. In a stop valve of the rotary type according to claim 4, wherein the valve member is arranged with its surface carrying the packing ring, so as to face the pressure side and with its back in the space free from pressure.

6. In a stop valve of the rotary type comprising a rotatable valve member adapted to shut a fluid passageway, a metallic sealing surface being a surface of rotation around the axis of rotation of said valve member, an inflatable packing ring, seated upon said valve member, capable of being inflated by the pressure of the fluid so as to form a tight joint between said valve member and said metallic sealing surface and means associated with said valve member to establish communication between the space at the back of the valve member and the open air when the valve member is in its shut position.

7. In a stop valve of the rotary type comprising a rotatable valve member adapted to shut a fluid passage, a metallic sealing surface adapted to allow free rotation of said valve member, means for holding an inflatable packing on said valve member at an uniform distance from said metallic sealing surface during rotation, said packing ring facing the pressure side, and being capable of bridging the distance between said valve member and said metallic surface when a fluid under pressure is admitted and means to simultaneously establish a communication of the side behind the valve member with the open air.

8. In a stop valve of the rotary type, a casing and a passageway for fluid therein, a rotatable valve member carrying an inflatable packing ring at the pressure side of said passageway, a metallic sealing surface, arranged to allow part rotation of said valve member and to leave a gap between it and said packing ring when not inflated, a channel in said casing leading to the open and a second channel in said valve member behind the packing ring, both channels being brought to correspondence in the position of the valve member where the packing ring is inflated.

9. In a stop valve according to claim 8, a trough shaped depression in said casing behind the valve member, the channel in the casing leading to said trough shaped depression.

10. In a stop valve according to claim 8, a trough shaped depression in the casing behind the valve member to collect any fluid leaking through the packing ring, an elevated run behind said depression, for preventing the collected leaking fluid to penetrate into parts annexed to said stop valve, and a communication with the open air established by means of the corresponding channels leading from said depression.

In testimony whereof I affix my signature.

HERMANN SRULOWITZ.